United States Patent [19]

Sato

[11] Patent Number: 5,113,718
[45] Date of Patent: May 19, 1992

[54] TRANSMISSION RATIO CONTROL SYSTEM OF A CONTINUOUSLY VARIABLE TRANSMISSION FOR A MOTOR VEHICLE

[75] Inventor: Keiji Sato, Tokyo, Japan

[73] Assignee: Fuji Jukogyo Kabushiki Kaisha, Tokyo, Japan

[21] Appl. No.: 632,967

[22] Filed: Dec. 21, 1990

[30] Foreign Application Priority Data

Dec. 28, 1989 [JP] Japan .................. 1-343308

[51] Int. Cl.⁵ .............................................. B60K 41/16
[52] U.S. Cl. ..................................... 74/846; 180/197; 192/4 A; 74/862
[58] Field of Search ...................... 303/93, 112, 113; 180/177, 197; 192/4 A; 74/846, 862; 474/18, 28

[56] References Cited

U.S. PATENT DOCUMENTS

| | | |
|---|---|---|
| 3,331,480 | 9/1963 | Christenson et al. ................ 74/846 |
| 3,426,624 | 2/1969 | Karig et al. ........................ 74/846 |
| 3,756,358 | 9/1973 | Espenschied et al. ......... 192/4 A X |
| 4,113,076 | 9/1978 | Lee et al. ............................ 192/4 A |
| 4,762,196 | 8/1988 | Harada ................................ 180/197 |
| 4,829,433 | 5/1989 | Nakano et al. ................. 192/4 A X |
| 4,840,436 | 6/1989 | Burgdorf et al. ............... 303/113 X |
| 5,015,043 | 5/1991 | Resch ............................. 180/197 X |

FOREIGN PATENT DOCUMENTS 1-52535 1/1989 Japan.

Primary Examiner—Leslie A. Braun
Assistant Examiner—Daniel Wittels

[57] ABSTRACT

A belt drive continuously variable transmission has a primary pulley operatively connected to an engine and a secondary pulley operatively connected to wheels of a motor vehicle, hydraulic cylinders for changing effective diameters of both pulleys, and a transmission ratio control valve for producing a primary pressure applied to the primary cylinder for controlling transmission ratio. An anti-lock brake system is provided on the vehicle. A deceleration of the vehicle is calculated based on vehicle speed. Time from an end of operation of the antilock brake system until the vehicle stops is calculated based on the calculated deceleration and to the vehicle speed. Furthermore, downshifting speed necessary to increase the actual transmission ratio to a maximum transmission ratio before the vehicle stops is calculated based on the calculated time until the vehicle stops and to the actual transmission ratio. In place of the transmission ratio changing speed, the calculated downshifting speed is used when the operation of the antilock brake system ends.

3 Claims, 5 Drawing Sheets

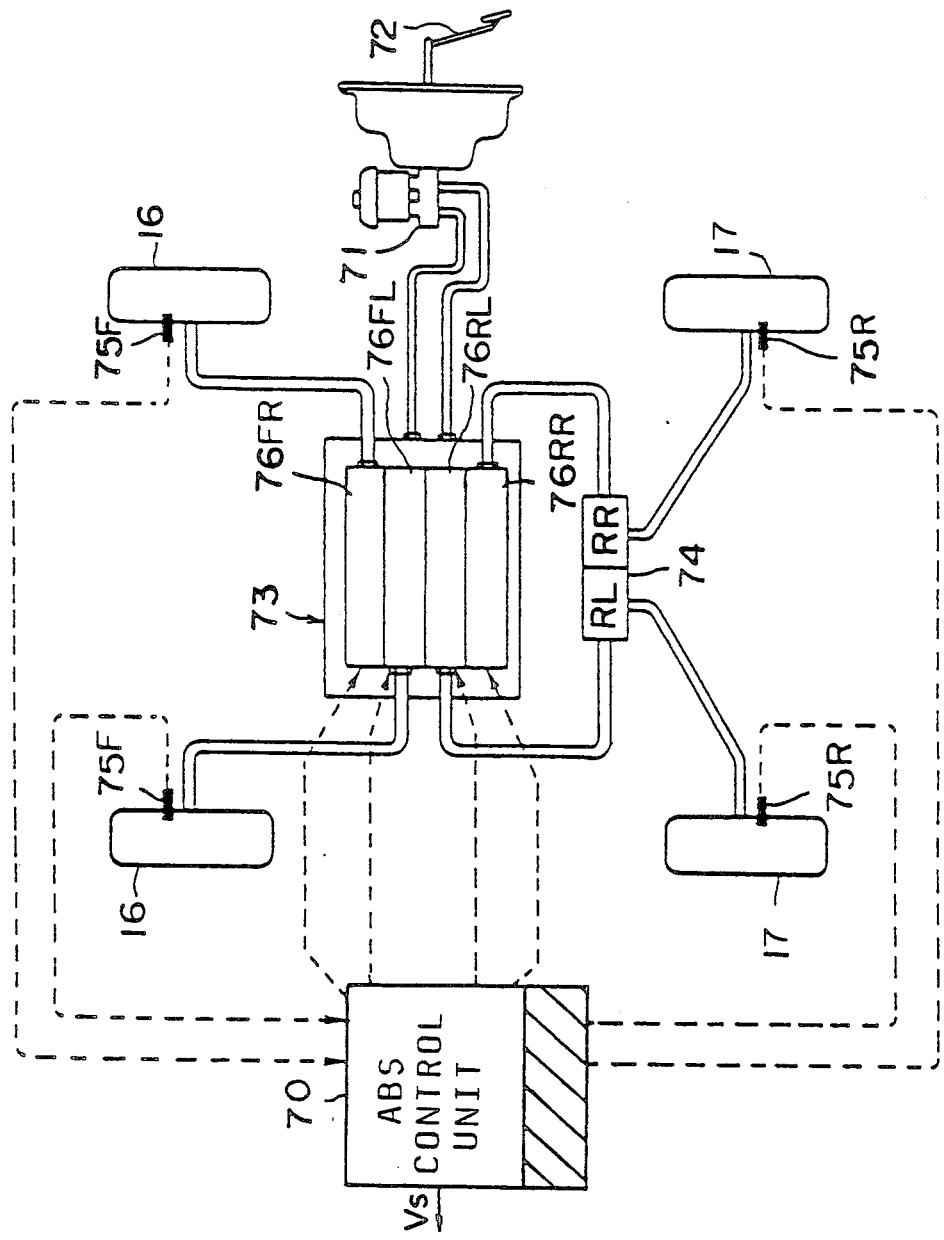

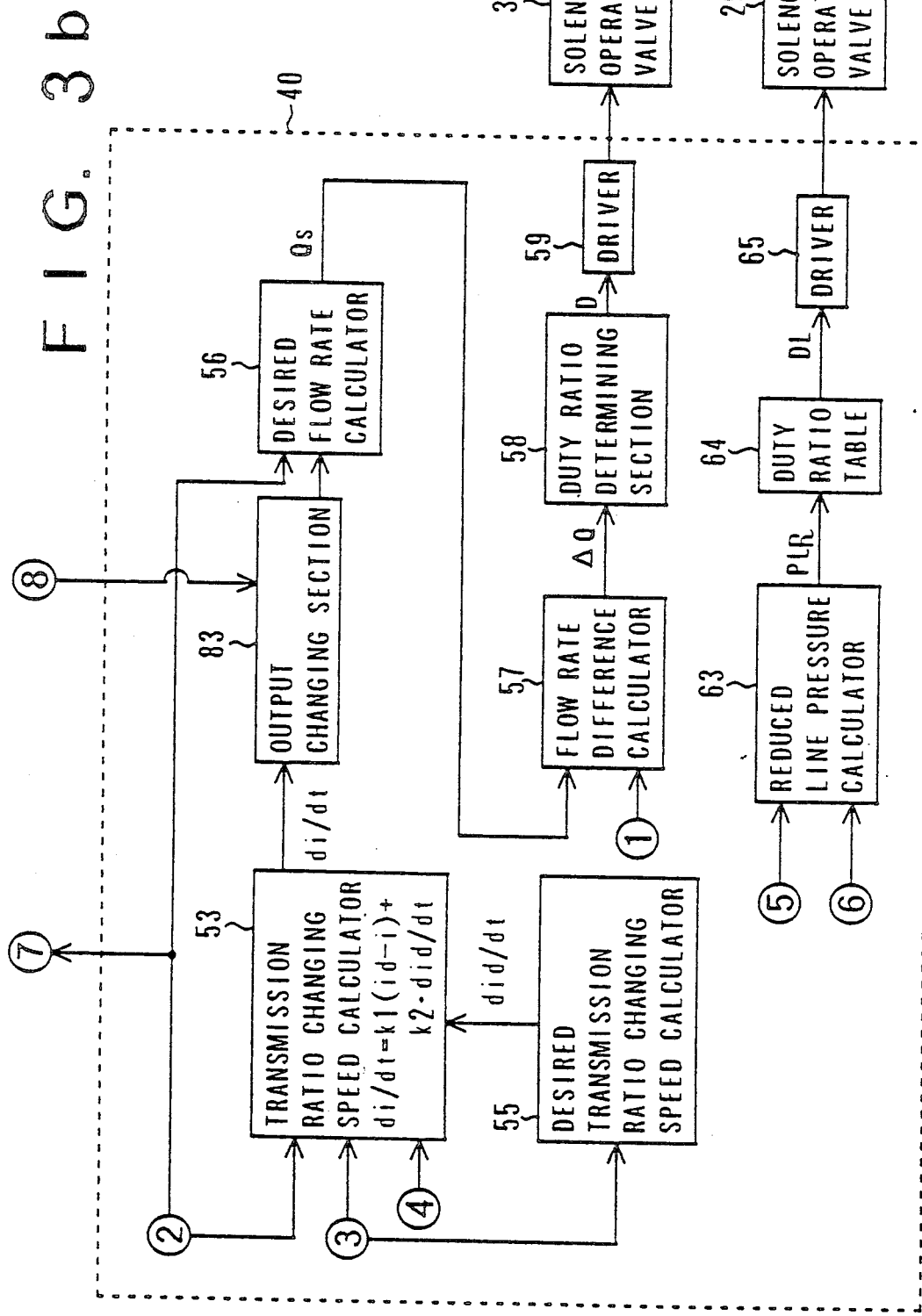

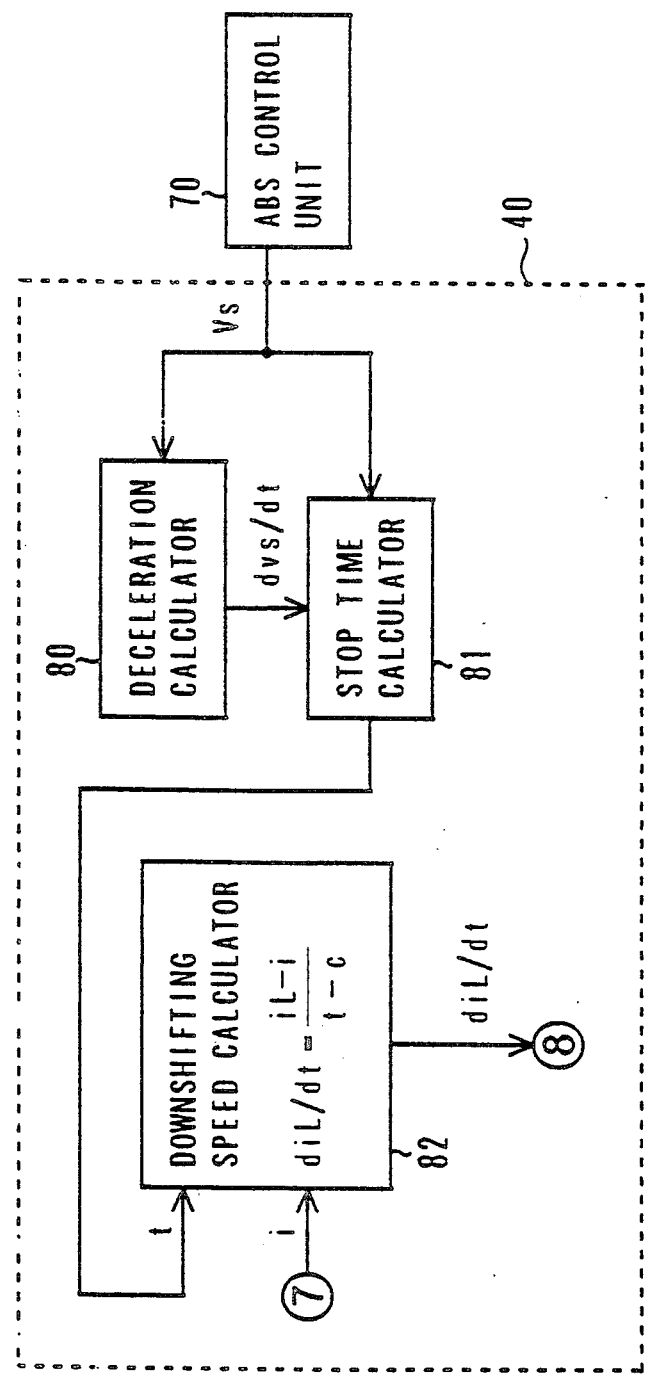

TRANSMISSION RATIO CONTROL SYSTEM OF A CONTINUOUSLY VARIABLE TRANSMISSION FOR A MOTOR VEHICLE

BACKGROUND OF THE INVENTION

The present invention relates to a system for controlling transmission ratio of a continuously variable belt-drive automatic transmission (CVT) for a motor vehicle having an antilock brake system.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

An electronic control system is provided for controlling the hydraulic circuit corresponding to the driving conditions of the motor vehicle. An optimum desired transmission ratio is determined in accordance with vehicle speed and throttle valve opening degree to obtain the transmission ratio. Japanese Patent Application Laid-Open 64-52535 submitted by the applicant discloses such a system.

The antilock brake system (ABS) is provided for preventing the wheels from completely locking at rapid braking or at braking on slippery surfaces such as a snowy road, thereby ensuring directional stability and steering control of the vehicle during the braking operation and improving safety of the vehicle.

The ABS operates in such a manner as to intermittently brake the wheels. Consequently, the rotating speed of the wheels, that is the vehicle speed measured by rotational speed of the output shaft of the transmission changes at a short interval, and hence the transmission ratio fluctuates.

Accordingly, when the ABS is in operation, the transmission is not accurately controlled corresponding to the vehicle speed, so that the downshifting of the transmission delays. On the other hand, the transmission must be downshifted to a maximum transmission ratio (low gear) when the vehicle is stopped. However, the transmission can not be completely downshifted to the maximum transmission ratio because of the delay. Therefore a sufficient acceleration can not be obtained at restarting of the vehicle.

SUMMARY OF THE INVENTION

The object of the present invention is to provide a transmission control system in which a transmission ratio is properly controlled during an ABS operation, thereby providing sufficient acceleration at restarting of a vehicle.

According to the present invention, there is provided a system for controlling the transmission ratio of a continuously variable belt-drive transmission connected to an engine mounted on the vehicle, having a primary pulley with a hydraulically shiftable disc and a primary hydraulic cylinder for shifting the disc, a secondary pulley including a hydraulically shiftable disc and a secondary hydraulic cylinder for shifting the disc thereof, a belt engaged with both pulleys, a hydraulic circuit for supplying oil from a pump to the cylinders, a transmission ratio control valve for controlling a primary pressure applied to the primary cylinder, a line pressure control valve for controlling a secondary pressure applied to the secondary cylinder, a throttle position sensor for producing a throttle opening degree signal, speed sensors for detecting speeds of the primary pulley and secondary pulley and the engine respectively and for producing respective speed signals, actual transmission ratio calculating means responsive to the primary pulley speed signal and secondary pulley speed signal for calculating an actual transmission ratio and for producing an actual transmission ratio signal, desired transmission ratio calculating means responsive to the secondary pulley speed signal and the throttle opening degree signal for calculating a desired transmission ratio and for producing a desired transmission ratio signal, transmission ratio changing speed calculator means responsive to the actual transmission ratio and the desired transmission ratio for calculating a transmission ratio changing speed, valve operating means responsive to the actual transmission ratio signal and the desired transmission ratio signal for operating the transmission ratio control valvo so as to control the transmission ratio to the desired transmission ratio, and an antilock brake system.

The system comprises deceleration calculator means responsive to a pseudo vehicle for calculating a deceleration of the vehicle, stop time calculator means responsive to the deceleration and to the pseudo vehicle speed for calculating an operation time of the antilock brake system, downshifting speed calculator responsive to the time for calculating a downshifting speed to increase the actual transmission ratio to a maximum transmission ratio before the vehicle stops, and changing means for changing the transmission ratio changing speed to the downshifting speed when the operation of the antilock brake system ends.

The other objects and features of the present invention will become understood from the following description with reference to the accompanying drawings.

BRIEF DESCRIPTION OF DRAWINGS

FIG. 2 is a schematic diagram showing an antilock brake system (ABS); and

FIGS. 3a to 3c are block diagrams showing a control unit of the system.

DETAILED DESCRIPTION OF THE PREFERRED EMBODIMENT

Figure 1:
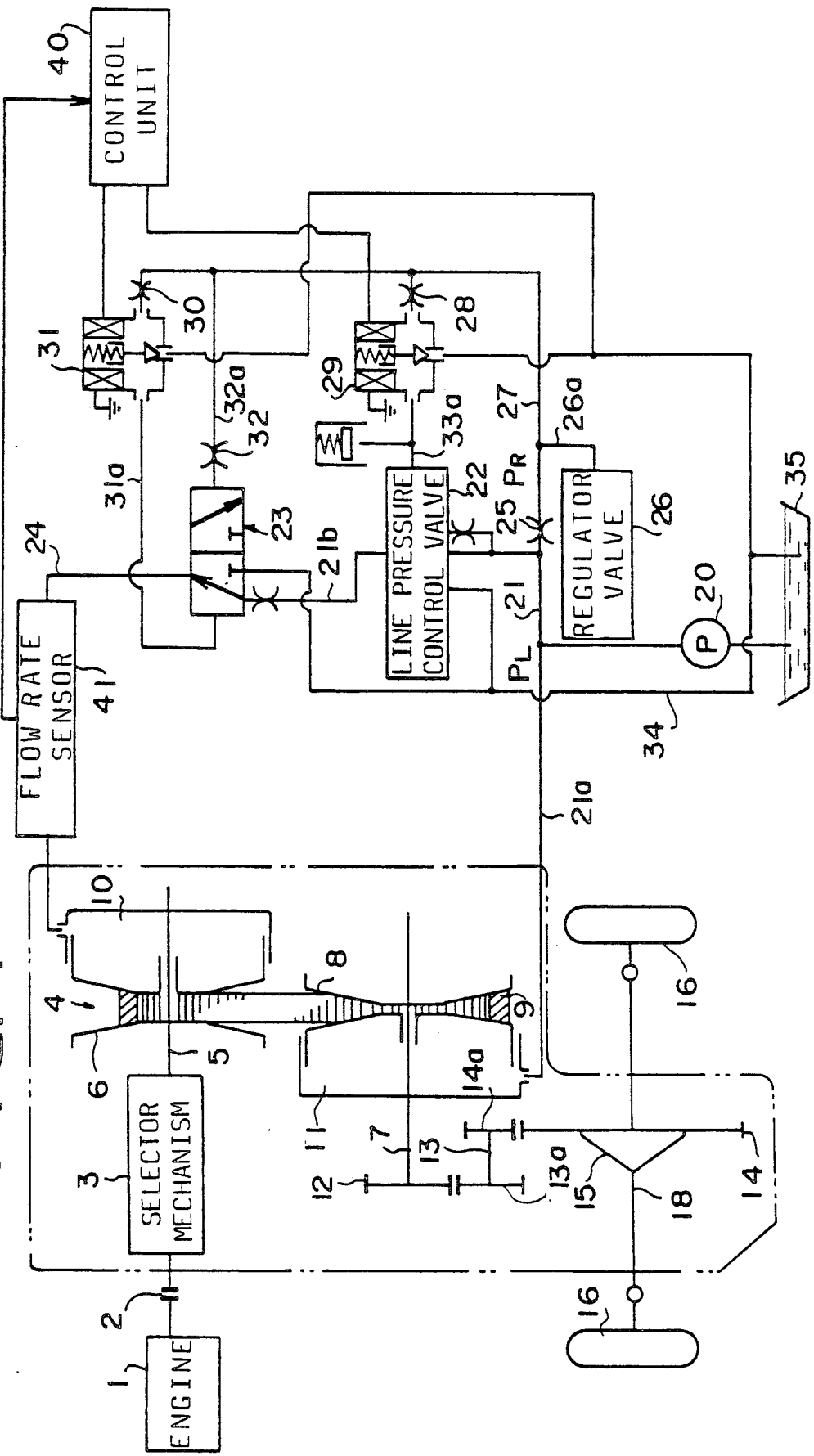
FIG. 1 is a schematic illustration showing a continuously variable belt-drive transmission according to the present invention.

Referring to FIG. 1, a continuously variable belt-drive automatic transmission 4 for a motor vehicle to which the present invention is applied, comprises a clutch 2 for transmitting power of an engine 1 to the transmission 4 through a selector mechanism 3.

The belt-drive transmission 4 has a primary shaft 5 and a secondary shaft 7 provided in parallel with the primary shaft 5. A primary pulley 6 provided with a primary hydraulic cylinder 10 is mounted on the primary shaft 5. A secondary pulley 8 provided with a secondary hydraulic cylinder 11 is mounted on the secondary shaft 7. A drive belt 9 engages with the primary pulley 6 and the secondary pulley 8. The cylinder 10 of the primary pulley 6 is so designed that a pressure receiving area thereof is larger than that of the cylinder 11 of the secondary pulley 8. Thus, the running diameter of the belt 9 on the pulleys 6, 8 is varied dependent on driving conditions.

Secured to the secondary shaft 7 is a drive gear 12 which engages with an intermediate reduction gear 13a on an intermediate shaft 13. An intermediate gear 14a on the shaft 13 engages with a final reduction gear 14. Rotation of the final reduction gear 14 is transmitted to axles 18 of the vehicle driving wheels 16 through a differential 15.

Describing a hydraulic control circuit of the transmission 4, oil in an oil reservoir 35 is supplied to a line pressure control valve 22 through a line pressure passage 21 by the pump 20. An oil passage 21a connected to the passage 21 is communicated with the cylinder 11 of the secondary pulley 8. The passage 21 is further communicated with a transmission ratio control valve 23 through a passage 21b. The cylinder 10 of the secondary pulley 6 is applied with pressurized oil through the passage 21, the line pressure control valve 22, the passage 21b, the transmission ratio control valve 23, and a passage 24.

The passage 21 connected to the oil pump 20 is communicated with a regulator valve 26 through a passage 26a for regulating the pressure of the oil.

The regulator valve 26 is communicated with the line pressure control valve 22 through the passage 26a, a passage 27, an orifice 28, a solenoid operated valve 29, and a passage 33a having an accumulator 33. Further, the passage 27 is communicated with an end chamber of the transmission ratio control valve 23 through a passage 32a having an orifice 32, and with another end chamber through an orifice 30, a solenoid operated valve 31 and a passage 31a.

The solenoid operated valve 29 is adapted to be operated by duty signals from a control unit 40 for producing control pressure in the form of pulses. The pulsation of the control pressure is smoothed by the accumulator 33 and the control pressure is applied to the line pressure control valve 22, so that a line pressure $P_L$ is controlled in accordance with a transmission ratio i and an engine torque T.

The solenoid operated valve 31 is also operated by the duty signals and produces reducing pressure which is applied to the transmission ratio control valve 23 for shifting a spool of the valve 23 to an oil supply position and an oil drain position by a degree of a duty ratio. Thus, the flow rate Q of the oil supplied to or drained from the cylinder 10 of the secondary pulley 6 is controlled to provide the optimum transmission ratio i and a transmission ratio changing speed di/dt.

A flow rate sensor 41 is provided on the passage 24 for monitoring a flow rate Q supplied to or drained from the cylinder 11 and for producing a signal which is applied to the control unit 40 for a feedback control.

A drain port of each solenoid operated valve 29 and 30 is connected to a passage 34 to drain the oil to the reservoir 35.

Referring to FIG. 2 showing an antilock brake system (ABS), a brake pedal 72 is connected to a master cylinder 71 for producing fluid pressure in accordance with the depression of the brake pedal 72. The master cylinder 71 is communicated with a hydraulic unit 73 having four solenoid valves 76FR, 76FL, 76RR and 76RL for adjusting the pressure. The solenoid valves 76FR and 76FL for the front wheels 16 are communicated with a brake device of the front wheel 16. The solenoid valves 76RR and 76RL for rear wheels 17 are communicated with a brake device of the rear wheel 17 through a proportioning valve 74 for adjusting the fluid pressure to the rear wheels 17. A front wheel speed sensor 75F and a rear wheel speed sensor 75R are provided adjacent each front wheel 16 and rear wheel 17, respectively, for detecting a front wheel speed and a rear wheel speed. Front wheel speed signals from the sensors 75F and rear wheel speed signals from the sensors 75R are applied to an ABS control unit 70.

The ABS control unit 70 calculates the front and rear wheel speeds, acceleration or deceleration of the wheel, and a pseudo vehicle speed Vs based on the signals from the front and rear wheel speed sensors 75F and 75R. The pseudo vehicle speed Vs is compared with the front wheel speed and the rear wheel speed, and the acceleration or the deceleration is determined. In accordance with the comparison and determination, the unit 70 selects a hydraulic pressure mode of the brake pressure such as increasing mode, holding mode, and reducing mode. The control unit 70 produces a brake control signal corresponding to a selected mode which is applied to the solenoid valves 76FR, 76FL, 76RR and 76RL of the hydraulic unit 73. The solenoid valves are operated in accordance with the brake control signal for controlling the brake pressure for the respective front and rear wheels 16 and 17.

If one of the rear wheels 17 is going to be locked, the proportioning valve 74 is operated to control the pressure to the other rear wheel 17 to the same value as that of the locking wheel.

The pseudo vehicle speed Vs from the ABS control unit 70 is applied to the control unit 40.

Figure 3A:
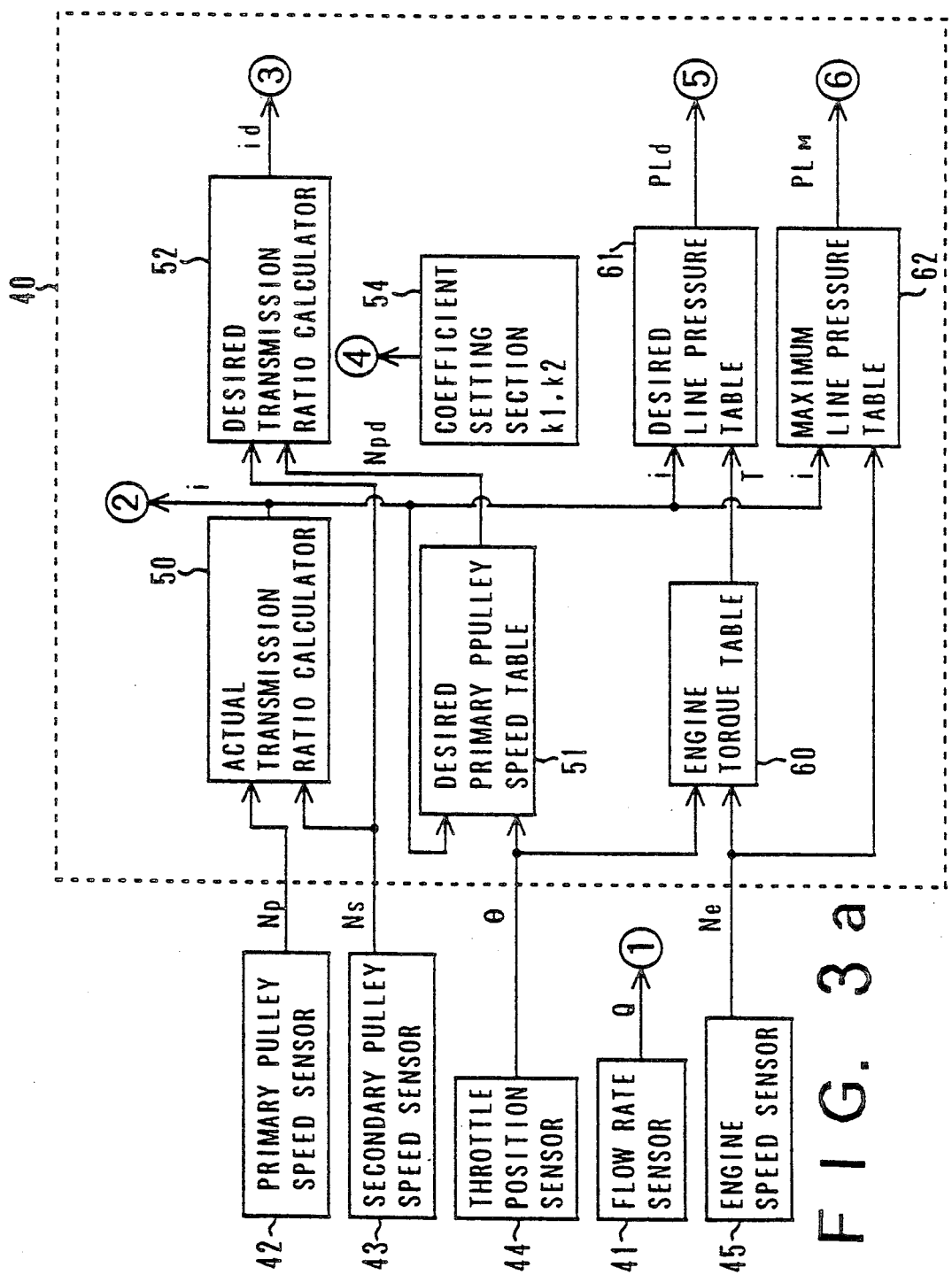

Referring to FIGS. 3a and 3b, the electronic control unit 40 is arranged to control the transmission ratio and the line pressure of the transmission 4. In the system, the flow rate sensor 41, a primary pulley speed sensor 42, a secondary pulley speed sensor 43, a throttle position sensor 44, and an engine speed sensor 45 are provided.

A primary pulley speed signal $N_P$ and a secondary pulley speed signal $N_S$ of the sensors 42, 43 are fed to an actual transmission ratio calculator 50 to produce an actual transmission ratio i in accordance with $i = N_P/N_S$. The actual transmission ratio i and an output signal $\theta$ representing the opening degree of the throttle position sensor 44 are fed to a desired primary pulley speed table 51 to derive a desired primary pulley speed Npd in accordance with values of the ratio i and the signal $\theta$. The desired primary pulley speed Npd and the secondary pulley speed signal $N_S$ are fed to a desired transmission ratio calculator 52 to calculate a desired transmission ratio id in accordance with $id = Npd/N_S$.

The desired transmission ratio id is fed to a desired transmission ratio changing speed calculator 55 which produces a desired transmission ratio changing speed did/dt. The speed did/dt is the amount of change of the desired transmission ratio id during a predetermined time interval. A coefficient setting section 54 produces coefficients K1 and K2. The actual transmission ratio i, the desired transmission ratio id, the desired transmission ratio changing speed did/dt and coefficients K1 and K2 are applied to a transmission ratio changing speed calculator 53 to produce a transmission ratio changing speed di/dt from the formula as follows.

$$di/dt = K1(id - i) + K2 \cdot did/dt$$

Where K1, K2 are coefficients, $id-i$ is a controlling amount dependent on the difference between the desired and actual transmission ratios, and $did/dt$ is a correction factor for the delay in operation of the system.

The speed $di/dt$ and actual ratio i are applied to a desired flow rate calculator 56 in which a necessary flow rate of the oil to the cylinder 10, namely a desired flow rate Qs corresponding to the transmission ratio changing speed $di/dt$ is calculated. The desired flow rate Qs is applied to a flow rate difference calculator 57 to which the actual flow rate Q detected by the sensor 41 is also applied. In the calculator 57, the difference $\Delta Q$ between the desired flow rate Qs and the actual flow rate Q is calculated. The difference $\Delta Q$ is applied to a duty ratio determining section 58. A duty ratio D of pulses for energizing the solenoid is determined for correcting the actual flow rate Q to the desired flow rate Qs. The duty ratio D is supplied to the solenoid operated valve 31 through a driver 59. The pressure of oil corresponding to the duty ratio D is supplied to the transmission ratio control valve 23 to change a pressure receiving area Si of the valve 23. Thus, the necessary flow rate Qi of oil corresponding to the speed $di/dt$ is supplied to the cylinder 10.

On the other hand, engine speed Ne from the engine speed sensor 45 and the throttle opening degree O from the throttle position sensor 44 are applied to an engine torque table 60 to derive an engine torque T. The engine torque T and the actual transmission ratio i from the calculator 50 is applied to a desired line pressure table 61 to derive a desired line pressure $P_{Ld}$.

In a hydraulic circuit of the control system, oil pressure discharged from the pump and applied to the line pressure control valve varies in accordance with the change of the engine speed Ne, so that a maximum line pressure $P_{LM}$ also varies. In order to detect the variance of the maximum line pressure $P_{LM}$, the control unit is provided with a maximum line pressure table 62 to which the engine speed Ne and the actual transmission ratio i are supplied. Therefore, the maximum line pressure $P_{LM}$ is obtained.

The desired line pressure $P_{Ld}$ and the maximum line pressure $P_{LM}$ are applied to a reduced line pressure calculator 64 wherein a reduced line pressure $P_{LR}$ is calculated based on the proportion of the desired line pressure $P_{Ld}$ to the maximum line pressure $P_{LM}$ as follows.

$$P_{LR} = P_{LM} - P_{Ld}$$

The reduced line pressure $P_{LR}$ is applied to a duty ratio table 64 to derive a duty ratio $D_L$ corresponding to the reduced line pressure $P_{LR}$. The duty ratio $D_L$ is supplied to a driver 65 which operates a solenoid operated valve 29 at the duty ratio. Thus, line pressure $P_L$, namely a secondary pressure Ps is controlled to the desired line pressure $P_{Ld}$ dependent on the engine torque T and the actual transmission ratio i.

In order to properly control the transmission during the ABS operation, the control unit 40 is provided with a deceleration calculator 80 to which an ABS operation signal and the pseudo vehicle speed Vs is applied from the ABS control unit 70. The deceleration calculator 80 calculates a deceleration $dVs/dt$ of the motor vehicle. The calculated $dVs/dt$ is applied to a stop time calculator 81 to which the pseudo vehicle speed Vs is also applied. In the calculator 81, a time t from the end of ABS operation, which is represented by the disappearance of the ABS signal, until the vehicle comes to a stop is calculated as follows.

$$t = Vs/(dVs/dt)$$

The time t until stopping is applied to a downshifting speed calculator 82 to which the actual transmission ratio i is also applied. The calculator 82 calculates a downshifting speed $diL/dt$ until the stopping of the vehicle. The speed $diL/dt$ is a value sufficient to change the transmission ratio i to a maximun transmission ratio iL within the time t after the ABS operation. The downshifting speed is expressed as follows.

$$diL/dt = (iL-i)/(t-c)$$

where c is a predetermined spare time.

The downshifting speed $diL/dt$ until stopping is applied to an output changing section 83 to which the transmission ratio changing speed $di/dt$ is applied. The section 83 is provided between the transmission ratio changing speed calculator 53 and the desired flow rate calculators 56. When the downshifting speed $diL/dt$ until stopping is applied to the output changing section 83, the section 83 operates to apply the downshifting speed $diL/dt$ to the calculator 56, prior to the changing speed $di/dt$. When the downshifting speed $diL/dt$ is not applied to the section 83, the changing speed $di/dt$ is applied through the section 83 to the calculator 56.

Describing the operation of the transmission ratio control system, in an ordinary driving state of the vehicle, the desired transmission ratio id and the actual transmission ratio i are determined larger than the maximum transmission ratio of 2.5. The desired pressure is applied to the transmission ratio control valve 23 to drain the oil from the valve 23 so that a primary pressure Pp becomes the lowest pressure. The line pressure $P_L$ is applied only to the cylinder 11 of the secondary pulley 8 so that the drive belt 9 engages with the secondary pulley 8 at a maximum running diameter to provide the largest transmission ratio (low speed stage).

Further, the engine torque T is calculated in accordance with the throttle opening degree O and the engine speed Ne. Thus, the line pressure controlled by the line pressure control valve 22 is increased in accordance with the maximum transmission ratio i and the engine torque T to provide the desired line pressure $P_{Ld}$, thereby transmitting the torque without slipping of the belt 9.

At the start of the vehicle, the power of the engine 1 is transmitted to the primary shaft 5 through the clutch 2, and the selector mechanism 3, and to the secondary shaft 7 at the largest transmission ratio by the drive belt 9 and pulleys 6, 8 and further transmitted to the axles 18 of the driving wheels 16 through the gears 12, 13a, intermediate shaft 13, gears 14a, 14 and differential 15. Thus, the vehicle is started. The transmission is controlled based on the desired transmission ratio id and the engine torque T with the control unit 40 corresponding to the respective driving conditions in the wide range. Thus, the proper driveability is provided.

When the brake pedal 72 is depressed for rapid braking during the driving condition, the master cylinder 71 produces the brake fluid pressure which is supplied to the brake devices to brake the wheels 16 and 17. The ABS control unit 70 detects the deceleration condition in accordance with the front and rear wheel speeds from the sensors 75F and 75R. Thus, the ABS control starts. The ABS control unit 70 produces the brake control signal for providing a proper slip ratio of the front and rear wheels. The brake control signal is applied to the hydraulic unit 73. The solenoid valves 76FR, 76FL, 76RR and 76RL control the brake pressures to front and rear wheels 16 and 17 in accordance with the selected hydraulic pressure mode. Consequently, the driveability and steerability of the vehicle are ensured. When the ABS cotrol starts, the ABS control unit 70 produces the ABS signal and the pseudo vehicle speed Vs which are applied to the deceleration calculator 80 and the stop time calculator 81. The calculator 80 produces the calculated deceleration dVs/dt. In response to the disappearance of the ABS signal, the calculator 81 calculates and produces the stop time t in accordance with the deceleration dVs/dt and the pseudo vehicle speed Vs. The downshifting speed calculator 82 calculates and produces the downshifting speed diL/dt until stopping in accordance with the stop time t and the actual transmission ratio i. The downshifting speed diL/dt is applied to the output changing section 83. The downshifting speed diL/dt is applied to the desired flow rate calculator 56 from the output changing section 83 prior to the transmission ratio changing speed di/dt.

In the system, during the ABS operation, the transmission is controlled in accordance with the downshifting speed diL/dt until stopping.

Consequently, before the vehicle stops, the actual transmission ratio i changes to the maximum transmission ratio, thereby obtaining sufficient acceleration of the vehicle at the restarting.

When the vehicle is restarted, the ABS control unit 70 stops producing the output signal, the output of the downshifting speed diL/dt from the calculator 82 is stopped. The changing section 83 produces the transmission ratio changing speed di/dt to control the system in the ordinary state.

While the presently preferred embodiment of the present invention has been shown and described, it is to be understood that these disclosures are for the purpose of illustration and that various changes and modifications may be made without departing from the scope of the invention as set forth in the appended claims.

What is claimed is:

1. A system for controlling transmission ratio of a continuously variable belt-drive transmission connected to an engine mounted on a motor vehicle, having a primary pulley with a hydraulically shiftable disc and a primary hydraulic cylinder for shifting said disc, a secondary pulley including a hydraulically shiftable disc and a secondary hydraulic cylinder for shifting said disc thereof, a belt engaged with both pulleys, a hydraulic circuit for supplying oil from a pump to said cylinders, a transmission ratio control valve for controlling a primary pressure applied to said primary cylinder, a line pressure control valve for controlling a secondary pressure applied to said secondary cylinder, a throttle position sensor for producing a throttle opening degree signal, speed sensors for detecting speeds of said primary pulley and secondary pulley and said engine respectively and for producing respective speed signals, actual transmission ratio calculating means responsive to said primary pulley speed signal and secondary pulley speed signal for calculating an actual transmission ratio and for producing an actual transmission ratio signal, desired transmission ratio calculating means responsive to said secondary pulley speed signal and said throttle opening degree signal for calculating a desired transmission ratio and for producing a desired transmission ratio signal, transmission ratio changing speed calculator means responsive to said actual transmission ratio and said desired transmission ratio for calculating a transmission ratio changing speed, valve operating means responsive to said actual transmission ratio signal and said desired transmission ratio signal for operating said transmission ratio control valve so as to control the transmission ratio to the desired transmission ratio, and an antilock brake system, the system comprising:

a deceleration calculator responsive to a pseudo vehicle speed for calculating a deceleration of said vehicle;

a stop time calculator responsive to the deceleration and to said pseudo vehicle speed for calculating an operation time of said antilock brake system;

a downshifting speed calculator responsive to the time for calculating a downshifting speed necessary to increase the actual transmission ratio to a maximum transmission ratio before said vehicle stops; and changing means for changing said transmission ratio changing speed to said downshifting speed when the operation of said antilock brake system ends.

2. The system according to claim 1, wherein said valve operating means comprises desired flow rate calculated means responsive to said downshifting speed for calculating a desired flow rate of said oil supplied to said primary hydraulic cylinder.

3. The system according to claim 1, further comprising an ABS operation detector for detecting operation of said antilock brake system and for producing an ABS operation signal, said operation of the antilock brake system being represented by disappearance of the ABS signal.

* * * * *